Sept. 23, 1969    O. VOHLER ETAL    3,468,718
METHOD OF PRODUCING POROUS CARBON BODIES OF STRATIFIED
CONSTITUTION FROM CELLULOSIC PARTICLES
Filed May 5, 1966
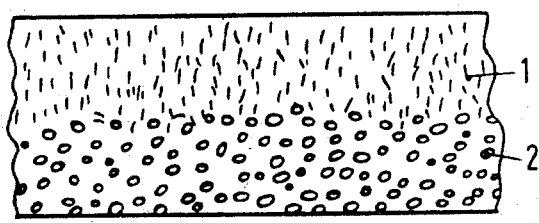

United States Patent Office 3,468,718
Patented Sept. 23, 1969

3,468,718
METHOD OF PRODUCING POROUS CARBON BODIES OF STRATIFIED CONSTITUTION FROM CELLULOSIC PARTICLES
Otto Vohler, Nordendorf uber Augsburg, and Renato Martina, Meitingen uber Augsburg, Germany, assignors to Siemens-Planiawerke A.G., fur Kohlefabrikate Meitingen uber Augsburg, Germany, a corporation of Germany
Filed May 5, 1966, Ser. No. 547,979
Claims priority, application Germany, May 5, 1965,
S 96,962
Int. Cl. H01m 13/04; C01b 31/02
U.S. Cl. 136—122
10 Claims

ABSTRACT OF THE DISCLOSURE

Method of producing a porous solid biporous body of carbon from a binder-free green mass of cellulosic particle material having substantially uniform grain size forming carbon bridges between adjacent granules when carbonized, either by pressing a plurality of strata of the green mass in the coaxial direction thereof, each wetted at least at the adjacent surfaces of the strata by a quantity of polar substance different from one another to a shaped body in the absence of binding medium, or applying respectively different amounts of pressure to each stratum of a plurality of superimposed strata of the green mass in the coaxial direction thereof and a quantity of polar substance between adjacent surfaces of the strata so as to form the strata into a shaped body in the absence of binding medium, and coking the body to obtain a solid porous structure.

---

Our invention relates to porous carbon bodies and a method of producing them, and is related to the invention disclosed and claimed in the copending application of Otto Vohler et al., Ser. No. 514,798, filed Dec. 20, 1965.

In the copending application Ser. No. 514,798 there is described a method of producing porous carbon bodies from a solid carbon compound capable of forming carbon bridges between adjacent granules when being carbonized as is the case, for example, with cellulose. A green mass of such a carbon material used in a substantially uniform grain size is pressed to a shaped body in the absence of binding medium and is subsequently subjected to coking and, if desired, to subsequent graphitizing, in order to produce a solid porous structure.

This method results in substantially homeoporous carbon bodies as required particularly for electrodes in electrochemical fuel cells. In some cases, however, it is desirable to employ porous carbon bodies exhibiting a stratified structure in which each individual layer is homeoporous but has a median pore diameter different from that of the adjacent layer. It is known, for example, to employ twin-layer catalyst electrodes according to Professor E. Justi in electrical fuel cells. These electrodes are composed of nickel and comprise a coarse-porous base layer and a fine-porous cover layer. In the fuel cells the coarse pore layer faces the gas side. The fine pore layer prevents gaseous fuel or oxidant from bubbling through the electrode without being properly utilized therein.

Attempts have been made to also produce twin-layer electrodes of carbon. Known is a twin-layer electrode made of a coarsely porous plate of carbon or graphite upon which an ion-exchange resin laden with metal ions is deposited and then carbonized. In an electrode made in this manner the fine-porous layer is poorly bonded to the material of the base plate and easily tends to scale off.

It is an object of our present invention to devise a stratified or twin-layer electrode of carbon, as well as a method of producing it, which eliminates the shortcomings heretofore encountered.

According to our invention, we have discovered that the desired improvement is achieved on the basis of the above-mentioned method according to the copending application Serial No. 514,798 if this method is modified by applying a stratifying effect upon the pore structure of the material as it is being subjected to the above-mentioned compressing and shaping operation.

More specifically, according to a feature of our invention, we produce carbon bodies by the above-mentioned method and simultaneously apply respectively different processing or pressing conditions to respectively different strata of the body being press-molded so as to obtain a stratification in which each individual layer is substantially homeoporous in itself but has a median pore diameter different from that of adjacent layers.

The accompanying drawing, for example, shows schematically a cross section of a carbon structure made according to the invention and having a fine-pore top layer 1 and a coarse-pore bottom layer 2 within a single integral body.

It has been found particularly advisable to produce such stratification by adding, prior to the pressing operation, respectively different quantities of polar substances to respective layers of the material. This results in a carbon body in which those layers containing a larger quantity of polar substance develop finer pores than the layers containing smaller quantities of the polar substance or no polar substance. A particular advantage of this method resides in the fact that no boundary layers are formed between the individual layers but that these directly merge with each other and form a coherent and strong unitary body.

Another advantageous variant of the method is to apply respectively different compressing forces when pressing individual layers of the carbon body. This is done particularly by pressing the layers successively in the sequence of their porosity, commencing with the most finely porous layer. After pressing each layer, a polar substance is brought upon the surface of the pressed layer, whereafter the carbon material for the next layer is deposited and then compressed at a lower pressure together with the layer previously compressed.

Water and alcohols have been found particularly well suitable as polar substances for this mode of the method.

According to still another variant of our invention, a catalyst solution is employed as pressing aid. When producing the porous carbon bodies, if these are to be used as electrodes for electrochemical fuel cells, the required catalyst may be introduced from the outside into the twin-layer electrode mass.

In this connection it is particularly advisable to employ the above-described mode according to which the difference in pore structure is produced or promoted by employing respectively different pressure forces, and the polar substance is applied only at the boundary between adjacent layers, this substance being constituted by the catalyst solution. Hence the catalyst is located only at the place where the three-phase boundary will be formed during electrode operation in the fuel cell. As a result, only very slight quantities of catalyst are required. The catalyst here referred to is the one employed in the fuel cell for promoting the electrochemical reaction. A suitable catalyst solution for example is an aqueous solution of cobaltsulphate or of nickelsulphate.

The method will be further described in detail with reference to the following examples.

EXAMPLE 1

An amount of 5 g. dry microcrystalline cellulose is first poured into a press die of 56 mm. diameter. The poured quantity is equalized, preferably with the aid of the press plunger. Thereafter a further layer of 2.5 g. microcrystalline cellulose, containing 20% water, is filled into the die. The twin-layer body is then densified by a pressing operation applying a specific pressure of 200 kg./cm.$^2$. Due to the water contained in the top layer, this layer is considerably more densified than the bottom layer so that the pore maximum in the top layer is shifted toward smaller diameters. This maximum is at about 2.5$\mu$, whereas the maximum diameter in the coarse-porous layer is about 6$\mu$. Since the different layers, when subsequently subjected to carbonizing temperature, will shrink differently, the following precaution must be observed. The pre-drying of the pressed body prior to carbonizing must be effected at a very slow rate. For this purpose, the pressed bodies are stored for one week at about 20 to 25° C. After pre-drying, the bodies are placed between plates of graphite and the assemblies of plates and bodies are built into the carbonizing furnace under mechanical pressure. Baking and carbonizing are then effected in the same manner as described in the copending application Ser. No. 514,798, namely as follows:

The coking of the pressed green bodies is effected under exclusion of air by heating them up to 500° C. at a rate of no more than 10° C. per hour and then continuing the heating up to 1000° C. at a maximum rate of 50° C. per hour. During coking, the shaped body shrinks linearly about 20 to 40%. Upon completion of the treatment, the shaped and now solidified body is suitable for use but, if desired, may be subjected to graphitizing treatment at higher temperature in the conventional manner.

EXAMPLE 2

5 g. of microcrystalline cellulose are poured into a press die of 70 mm. diameter and then compressed at a pressure of 800 kg./cm.$^2$. This produces a fine-porous layer. To provide for good bonding with the coarse-porous layer still to be produced, approximately 0.2 cm.$^3$ water is sprayed onto the first layer, which can be done directly within the die. Thereafter 5 g. cellulose powder are poured on top of the first layer for producing the coarse-porous layer. The entire body is then shaped under a pressure of 100 kg./cm.$^2$. The drying and baking processes are then effected in the same manner as described in Example 1. After baking, the coarse-porous layer has a pore maximum at about 10$\mu$, the fine-porous layer a maximum at about 2.8$\mu$.

The individual layers of the porous carbon bodies thus produced are integrally bonded to each other to form a mechanically strong unit and exhibit good and continuous electrical conductivity between each other.

As mentioned, porous carbon bodies having layers of respectively different pore structure resulting from the method according to the invention are particularly well suitable for use as electrodes in electrochemical fuel cells. However, they are likewise applicable with advantage for any other use where porous bodies with stratified differences in pore size or density are needed. If desired, more than two layers of respectively different pore structure can thus be provided in a single carbon body.

We claim:

1. Method of producing a porous solid body of carbon which comprises preparing a binder-free green mass of cellulosic particle material having substantially uniform grain size and capable of forming carbon bridges between adjacent granules when carbonized, pressing a plurality of strata of the green mass in the coaxial direction thereof, each wetted at least at adjacent surfaces of the strata by a quantity of volatile polar substance different from one another, to a shaped body in the absence of binding medium, heating said body to volatilize said polar substance and to coke the body to obtain a solid porous structure and thereby forming integrally bonded layers that are individually substantially homeoporous but have respective median pore diameters differing from layer to layer.

2. The method according to claim 1, which comprises adding respectively "different quantities" of polar substances to at least the adjacent surfaces of said different strata prior to pressing said strata.

3. The method according to claim 1, wherein the polar substance is water.

4. The method according to claim 1, wherein the polar substance is alcohol.

5. The method according to claim 1, wherein the polar substance is a solution of fuel-cell catalyst.

6. The method according to claim 1, which comprises storing the pressed bodies prior to coking for about one week at about 20 to 25° C.

7. The method according to claim 1, which comprises coking the pressed body between graphite plates under mechanical pressure applied in the coaxial direction of the strata.

8. Method of producing a porous solid body of carbon which comprises preparing a binder-free green mass of cellulosic particle material having substantially uniform grain size and capable of forming carbon bridges between adjacent granules when carbonized, applying respectively different amounts of pressure to each stratum of a plurality of superimposed strata of the green mass, in the coaxial direction thereof, and a quantity of volatile polar substance between adjacent surfaces of the strata, so as to form the strata into a shaped body in the absence of binding medium, heating said body to volatilize said polar substance and to coke the body to obtain a solid porous structure and thereby producing integrally bonded layers that are individually substantially homeoporous but have respective median pore diameters differing from layer to layer.

9. The method according to claim 8, which comprises pressing said strata successively at downwardly graduated respective pressures, commencing with highest pressure at the one stratum that is to develop the finest pores, and pressing each subsequently added stratum together with the one precedingly pressed.

10. The method according to claim 9, which comprises depositing a polarizing substance onto a surface of a pressed stratum before adding the next stratum onto said surface.

References Cited

UNITED STATES PATENTS

| | | | |
|---|---|---|---|
| 3,104,159 | 9/1963 | Davidson | 264—29 |
| 3,238,054 | 3/1966 | Bickerdike et al. | 264—29 |

FOREIGN PATENTS

| | | |
|---|---|---|
| 938,107 | 9/1963 | Great Britain. |

ALLEN B. CURTIS, Primary Examiner